Patented Dec. 8, 1936

2,063,028

UNITED STATES PATENT OFFICE 2,063,028

COMPOUNDS OF THE ANTHRAQUINONE SERIES AND PROCESS FOR PREPARING THEM

Edwin C. Buxbaum, Shorewood, and Henry R. Lee, South Milwaukee, Wis., assignors to E. I. du Pont de Nemours & Company, Wilmington, Del., a corporation of Delaware No Drawing. Application January 18, 1936, Serial No. 59,694

14 Claims. (Cl. 260—60)

This invention relates to the preparation of new formylamino-anthraquinone compounds.

We have found that alpha-formylamino-anthraquinones obtainable by the reaction of halogen anthraquinones with formamide, or amino-anthraquinones with formic acid, can be readily nitrated, and because of the strong directive influence of the formylamine group on the entering nitro radical, give products which are substantially pure, being relatively free from undesirable isomers. The nitrogroups enter the para position opposite the formylamino group, and where two formylamino radicals are present the compound can be mono- or di-nitrated; the mono-nitration being readily controlled by limiting the amount of nitrating agent used.

The nitro-formylamino-anthraquinones are easily reduced to the corresponding amino-formyl-amino-anthraquinones. The nitro or amino-formylamino-anthraquinones are also readily hydrolyzed in alkaline or acid solution to give the nitro-amino or poly-amino-anthraquinone compounds which are also valuable dyestuff intermediates.

The ease with which the formyl groups hydrolyze, especially in alkaline solution, makes it possible to carry out the reduction of the nitrogroups and hydrolysis of the formylamino groups simultaneously, thereby providing a simplified and much improved process for the preparation of di- and poly-amino-anthraquinones from 1-amino- and 1,5- or 1,8-diamino-anthraquinones.

It is therefore an object of this invention to prepare new and valuable nitro-formylamino-anthraquinones and nitro-amino-anthraquinones which are valuable dyestuffs or dyestuff intermediates. It is a further object to provide improvements in the process for preparing poly-amino-anthraquinones.

The following examples are given to more fully illustrate our invention, the parts used being by weight.

Example 1

58.8 parts of 1,5-diformylamino-anthraquinone (formed by the formylation of 1,5-diamino-anthraquinone with formic acid) are dissolved below 25° C. in 588 parts of sulfuric acid monohydrate. After solution is complete, add slowly over a period of two hours, 85 parts of a nitric acid sulfuric acid mixture containing 37% nitric acid keeping the temperature between 5 and 10° C. Hold the temperature at 5–10° C. until nitration is substantially complete. Pour the nitration mixture into 6000 parts of ice and water. The flocculent precipitate of 1,5-diformylamino-4,8-dinitro-anthraquinone is filtered off, washed acid free and dried.

Example 2

100 parts of 1,5-diformylamino-4,8-dinitro-anthraquinone as prepared above are slowly added to 1000 parts of 93% sulfuric acid. When all the nitro compound has been added, bring the temperature slowly to 100° C. Hold at 100° C. for several hours and then cool to 60° C. The warm solution is poured into 10,000 parts of ice and water, filtered, washed acid free and dried. The 1,5-diamino-4,8-dinitro compound so obtained can be reduced in the customary manner with sodium hydroxide and sodium sulfide to give 1,4,5,8-tetramino-anthraquinone.

Example 3

192 parts of 1,5-diformylamino-4,8-dinitro-anthraquinone produced as in Example 1 by the action of nitric acid on 1,5-diformylamino-anthraquinone are suspended in 2000 parts of water to which has been added 35 parts of sodium hydroxide and 468 parts of 100% sodium sulfide as a 20% solution. The reduction mixture is brought to a boil and boiled for thirty minutes. The hot mixture is then filtered and washed alkali free with hot water. The filtered 1,5-diformylamino-4,8-diamino-anthraquinone is dried at 100° C. It dies cellulose acetate reddish blue shades.

Example 4

100 parts of 1,5-diformylamino-4,8-diamino-anthraquinone are dissolved in 700 parts of 93% sulfuric acid allowing the temperature to rise. When all the base has been added, the temperature is raised to 90–100° C. until hydrolysis is complete. The hydrolyzed material is then isolated by pouring the acid solution into 5000 parts of cold water, filtering, washing acid free and drying. The 1,4,5,8-tetramino-anthraquinone is thus obtained in a substantially pure form.

Example 5

100 parts of 1,5-diformylamino-anthraquinone are dissolved in 1000 parts of sulfuric acid monohydrate and the mixture is cooled to 5–10° C. 65 parts of a nitric sulfuric acid mixture containing 37% nitric acid are then added over a period of two hours at 5–10° C. This temperature is held for four hours and then raised to 20–30° C. for ten hours. The reaction mass is poured into 8000 parts of cold water, filtered, washed acid free and dried. The 1,5-diformylamino-4-nitro-anthraquinone formed is a yellow brown powder.

Example 6

100 parts of 1,5-diformylamino-4-nitro-anthraquinone are dissolved in 600 parts of 97% sulfuric acid. The temperature is raised to 50° C. and held for five hours or until hydrolysis is complete. The acid solution is poured into 4200 parts of ice and water, filtered and washed acid free and dried. The 1,5-diamino-4-nitro-anthraquinones formed can be easily reduced to 1,4,5-triamino-anthraquinone.

Example 7

100 parts of 1,5-diformylamino-4-nitro-anthraquinone are suspended in 1500 parts of warm water. 40 parts of flake sodium hydroxide are then added and the mixture is agitated until all the alkali has been dissolved. 900 parts of 20% sodium sulfide or its equivalent are added. The mixture is boiled for one half hour and filtered hot, and the filter cake washed alkali free and dried. The product, which is 1,5-diformylamino-4-amino-anthraquinone, dyes cellulose acetate in violet shades.

Example 8

294 parts of 1,8-diformylamino-anthraquinone (formed in the usual manner by refluxing 1,8-diamino-anthraquinone with formic acid) are dissolved in 2372 parts of 100% sulfuric acid. The temperature of the reaction mass is kept below 25° C. during the addition of the diformylamino compound. After the addition has been completed, 111 parts of 63% nitric acid are slowly added, keeping the temperature at 5–10° C. After the nitric acid has been added, the temperature is kept at 5–10° C. for one to two hours and then raised to 20–30° C. and held until nitration is complete.

The reaction mass is then poured into 16000 parts of cold water and ice. The flocculent precipitate is filtered off, washed acid free and dried. It consists of 1,8-diformylamino-4-nitro-anthraquinone.

Example 9

100 parts of 1,8-diformylamino-4-nitro-anthraquinone, obtained as outlined in the previous example, are suspended in 1000 parts of warm water. To this suspension are added 100 parts of 40° Bé. sodium hydroxide solution and 850 parts of 20% sodium sulfide solution. The reduction mass is boiled for about one hour or until the reduction is complete. The mass is filtered, washed alkali free and then dried. The resulting 1,8-diformylamino-4-amino formed dyes cellulose acetate in light violet shades.

Example 10

100 parts of 1,8-diformylamino-4-nitro-anthraquinone obtained by nitration of 1,8-diformylamino-anthraquinone are dissolved in 800 parts of 85% sulfuric acid. The mixture is heated to 130–140° C. for two to four hours or until hydrolysis is complete. The hydrolysis mass is then poured into 5000 parts of cold water, filtered, washed acid free and dried. The compound obtained is 1,5-diamino-4-nitro-anthraquinone. It can be easily reduced in the customary manner to 1,4,5-triamino-anthraquinone.

Example 11

192 parts of 1,5-diformylamino-4,8-dinitro-anthraquinone produced as in Example 1 by the nitration of 1,5-diformylamino-anthraquinone are added to 1170 parts of sodium sulfide (20% solution or its equivalent) to which have been added 100 parts of sodium hydroxide. This reaction mixture is brought to a boil and the color of the solution changes rapidly to a dull blue-violet. The solution is boiled vigorously for one half hour or until the combined hydrolysis and reduction has been completed. The mass is then filtered hot and washed with hot water until entirely alkali free. The 1,4,5,8-tetramino-anthraquinone formed is dried at 100° C.

Example 12

384 parts of 1,5-diformylamino-4,8-dinitro-anthraquinone are suspended in 4000 parts of warm water. To this suspension are added 400 parts of sodium hydroxide. The mass is then brought to a boil and the heating is continued until all the yellow diformylamino-dinitro-anthraquinone has been hydrolyzed to the corresponding diamino-dinitro compound. When the hydrolysis has been completed, the 1,5-diamino-4,8-dinitro compound is filtered hot, washed alkali free with hot water and dried. Other alkalies such as sodium carbonate or potassium hydroxide may also be employed.

Example 13

251 parts of 1-formylamino-anthraquinone, made by refluxing 1-amino-anthraquinone with formic acid in the presence of sodium acetate, are dissolved in 2500 parts of sulfuric acid monohydrate, keeping the temperature under 25° C. during the addition. The mixture is agitated for one hour at 25° C. and then cooled to 5 to 10° C. 200 parts of a sulfuric nitric acid mixture containing 37% nitric acid are slowly added at a temperature of 5 to 10° C. The mass is held for four hours at this temperature and then allowed to agitate at 20 to 30° C. until nitration is completed. The nitration mass is poured into 25000 parts of cold water, filtered and washed acid free. The 1-formylamino-4-nitro-anthraquinone formed can be dried in a vacuum at 80° C., without decomposition.

Example 14

296 parts of 1-formylamino-4-nitro-anthraquinone obtained as in Example 13 are added to 2960 parts of 93% sulfuric acid. The mixture is heated slowly to 120° C. and held at that temperature until hydrolysis is complete. The mixture is then poured into 30,000 parts of cold water, filtered and washed acid free. The 1-amino-4-nitro-anthraquinone is dried at 100° C.

Example 15

296 parts of 1-formylamino-4-nitro-anthraquinone as prepared in Example 13 are suspended in 1000 parts of warm water in which 20 parts of sodium hydroxide have been previously dissolved. To this suspension are added 1600 parts of 20% sodium sulfide and the reduction mass brought to a boil. The reaction mixture changes to a red color after boiling and the temperature is held at 95 to 100° C. for thirty minutes. The hot mixture is filtered, washed alkali free with hot water, and dried.

The 1-formylamino-4-amino-anthraquinone formed in this manner is a red compound which dyes cellulose acetate in red shades.

Example 16

296 parts of 1-formylamino-4-nitro-anthraquinone as prepared in Example 13 are added to 1600 parts of 20% sodium sulfide to which have been added 150 parts of sodium hydroxide. The mixture is heated at 100° C. for thirty minutes or until the combined hydrolysis and reduction has been completed. When the reaction is finished, the reduction mass is filtered hot and the 1,4-diamino-anthraquinone washed alkali free with hot water and dried.

We claim:

1. An alpha-formylamino-anthraquinone carrying a substituent of the class consisting of —NH$_2$ and —NO$_2$ in at least one alpha position para to a formylamine group.

2. A 1,5-diformylamino-anthraquinone carrying at least one group of the class consisting of NH$_2$ and NO$_2$ in the remaining alpha position.

3. A 1,5-diformylamino-anthraquinone carrying an amine group in at least one of the remaining alpha positions.

4. A 1,5-diformylamino-4-amino-anthraquinone.

5. A 1,5-diformylamino-4,8-diamino-anthraquinone.

6. A 1-formylamino-anthraquinone carrying in the 4-position a substituent of the class consisting of NO$_2$ and NH$_2$.

7. A 1-formylamino-4-amino-anthraquinone.

8. The process which comprises nitrating an alpha-formylamino-anthraquinone, reducing the nitro group to the amine, and hydrolyzing the formylamino radical, the hydrolysis and reduction being effected in any order.

9. The process which comprises nitrating an alpha-formylamino-anthraquinone and reducing the nitro group to the amine.

10. The process which comprises nitrating an alpha-formylamino-anthraquinone and hydrolyzing the formylamino group to give the corresponding nitro amino compound.

11. The process which comprises nitrating an alpha-formylamino-anthraquinone and simultaneously hydrolyzing the formylamino group and reducing the nitro group to the amine in alkaline solution.

12. The process which comprises dinitrating 1,5-diformylamino-anthraquinone and reducing the nitro groups to the corresponding amino radicals, to give the 1,5-diformylamino-4,8-diamino-anthraquinone.

13. The process which comprises dinitrating 1,5-diformylamino-anthraquinone, reducing the nitro groups to the corresponding amino radicals to give the 1,5-diformylamino-4,8-diamino-anthraquinone and hydrolyzing the formylamino groups to give the 1,4,5,8-tetramino-anthraquinone.

14. The process described in claim 13 wherein the hydrolysis and reduction are carried out simultaneously in alkaline solution.

EDWIN C. BUXBAUM.
HENRY R. LEE.